US008773737B2

(12) United States Patent  
Mori

(10) Patent No.: US 8,773,737 B2  
(45) Date of Patent: Jul. 8, 2014

(54) IMAGE PROCESSING DEVICE HAVING SHEET CONVEYING MECHANISM

(75) Inventor: Kosuke Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 76 days.

(21) Appl. No.: 13/427,346

(22) Filed: Mar. 22, 2012

(65) Prior Publication Data

US 2012/0250113 A1 Oct. 4, 2012

(30) Foreign Application Priority Data

Mar. 23, 2011 (JP) ................................. 2011-064273  
Mar. 9, 2012 (JP) ................................. 2012-052933

(51) Int. Cl.  
*H04N 1/04* (2006.01)

(52) U.S. Cl.  
USPC ............ 358/498; 358/497; 358/496; 358/474

(58) Field of Classification Search  
USPC ................................. 358/498, 474, 497, 496  
See application file for complete search history.

(56) References Cited

U.S. PATENT DOCUMENTS

| 4,825,248 A | 4/1989 | Honjo et al. |
| 5,479,240 A | 12/1995 | Lee et al. |
| 5,907,759 A | 5/1999 | Yashiro |
| 5,983,796 A | 11/1999 | Ishida et al. |
| 2004/0141215 A1 | 7/2004 | Sugawara |
| 2011/0102864 A1* | 5/2011 | Ishikawa ...................... 358/498 |

FOREIGN PATENT DOCUMENTS

| JP | 58-6858 A | 1/1983 |
| JP | 62-085261 A | 4/1987 |

(Continued)

OTHER PUBLICATIONS

Extended European Search Report dated Jul. 5, 2012 from related European Application No. 12159848.6.

(Continued)

*Primary Examiner* — Houshang Safaipour  
(74) *Attorney, Agent, or Firm* — Scully, Scott, Murphy & Presser, PC

(57) ABSTRACT

A conveying path extends from a set position in which the original sheet is set to a discharge position in which the original sheet is discharged from the image-processing device. A control unit controls an image processing unit such that the image processing unit does not execute an image processing relevant to an original sheet when an elapsed time is less than a reference time and such that the image processing unit executes the image processing relevant to the original sheet when the elapsed time is greater than or equal to the reference time. The elapsed time is time from a point of time that the control unit begins to drive a conveying mechanism in response to a reception of the command by a command reception unit until a point of time that a sensor detects the original sheet conveyed by the conveying mechanism at the detection position.

7 Claims, 9 Drawing Sheets

(56) References Cited

FOREIGN PATENT DOCUMENTS

| | | |
|---|---|---|
| JP | 63-277151 A | 11/1988 |
| JP | 3-166166 | 7/1991 |
| JP | 4-108261 A | 4/1992 |
| JP | 5-11523 A | 1/1993 |
| JP | 08-002746 A | 1/1996 |
| JP | 08-301482 A | 11/1996 |
| JP | 8-317124 A | 11/1996 |
| JP | 09-240882 A | 9/1997 |
| JP | 11-151804 A | 6/1999 |
| JP | 2004-228611 A | 8/2004 |
| JP | 2005-66969 A | 3/2005 |
| JP | 2006-217514 A | 8/2006 |
| JP | 2006-298579 A | 11/2006 |

OTHER PUBLICATIONS

Japanese Official Action dated Feb. 5, 2013 together with English translation from related application 2012-052933.

Chinese Office Action dated Mar. 5, 2014 from related Chinese Application No. 201210080414.0, together with an English language translation.

* cited by examiner

IMAGE PROCESSING DEVICE HAVING SHEET CONVEYING MECHANISM

CROSS REFERENCE TO RELATED APPLICATION

This application claims priority from Japanese Patent Application Nos. 2011-064273 filed Mar. 23, 2011 and 2012-052933 filed Mar. 9, 2012. The entire contents of the priority applications are incorporated herein by reference.

TECHNICAL FIELD

The present invention relates to an image-processing device and a non-transitory computer readable storage medium storing a set of program instructions executed by an image-processing device, for discharging a residual sheet from the image processing device when such a sheet is present in the paper-conveying path.

BACKGROUND

When a conventional printing device is turned on and a paper jam has not occurred, the device always drives its conveying mechanism in order to discharge paper from the device, even when paper is not detected in the paper-conveying path.

SUMMARY

This configuration hinders efforts to reduce power consumption and accelerates performance degradation in the conveying mechanism. The problem is not limited to printing devices, but may also occur in image-reading devices that automatically convey an original.

This specification discloses an image-processing device and a non-transitory computer readable storage medium storing a set of program instructions executed by an image-processing device that avoids driving the conveying mechanism simply to discharge a sheet of paper or a sheet of an original document, for example, that is present in the conveying path.

In order to attain the above and other objects, the present invention provides an image-processing device including: a conveying path in which an original sheet is conveyed, a conveying mechanism, a sensor, an image processing unit, a command reception unit, a control unit, and a memory. The conveying path extends from a set position in which the original sheet is set to a discharge position in which the original sheet is discharged from the image-processing device. The conveying mechanism is configured to convey the original sheet that is present in the conveying path. The sensor is configured to detect whether or not the original sheet is present at a detection position in the conveying path. The image processing unit is disposed downstream of the sheet sensor in the conveying path and is configured to execute an image processing relevant to the original sheet conveyed along the conveying path. The command reception unit is configured to receive a command to begin the image processing. The control unit configured to control the conveying mechanism and the image processing unit. The memory stores a reference time beginning from a point of time that the control unit begins to drive the conveying mechanism to convey the original sheet set in the set position until a point in time that the sensor detects the original sheet that is conveyed from the set position by the conveying mechanism. The control unit controls the image processing unit such that the image processing unit does not execute the image processing relevant to the original sheet when an elapsed time is less than the reference time, the elapsed time being time from a point of time that the control unit begins to drive the conveying mechanism in response to a reception of the command by the command reception unit until a point of time that the sensor detects the original sheet conveyed by the conveying mechanism at the detection position, and such that the image processing unit executes the image processing relevant to the original sheet when the elapsed time is greater than or equal to the reference time.

According to another aspect, the present invention provides a non-transitory computer readable storage medium storing a set of program instructions executed by an image-processing device including: a conveying path in which an original sheet is conveyed, the conveying path extending from a set position in which the original sheet is set to a discharge position in which the original sheet is discharged from the image-processing device; a conveying mechanism configured to convey the original sheet that is present in the conveying path; a sensor configured to detect whether or not the original sheet is present at a detection position in the conveying path; an image processing unit disposed downstream of the sheet sensor in the conveying path and configured to execute an image processing relevant to the original sheet conveyed along the conveying path; and a memory storing a reference time beginning from a point of time that the control unit begins to drive the conveying mechanism to convey the original sheet set in the set position until a point in time that the sensor detects the original sheet that is conveyed from the set position by the conveying mechanism. The set of program instructions includes: receiving a command to begin the image processing; and controlling the image processing unit such that the image processing unit does not execute the image processing relevant to the original sheet when an elapsed time is less than the reference time, the elapsed time being time from a point of time that the control unit begins to drive the conveying mechanism in response to a reception of the command by the command reception unit until a point of time that the sensor detects the original sheet conveyed by the conveying mechanism, and such that the image processing unit executes the image processing relevant to the original sheet when the elapsed time is greater than or equal to the reference time.

DETAILED DESCRIPTION

Figure 1:
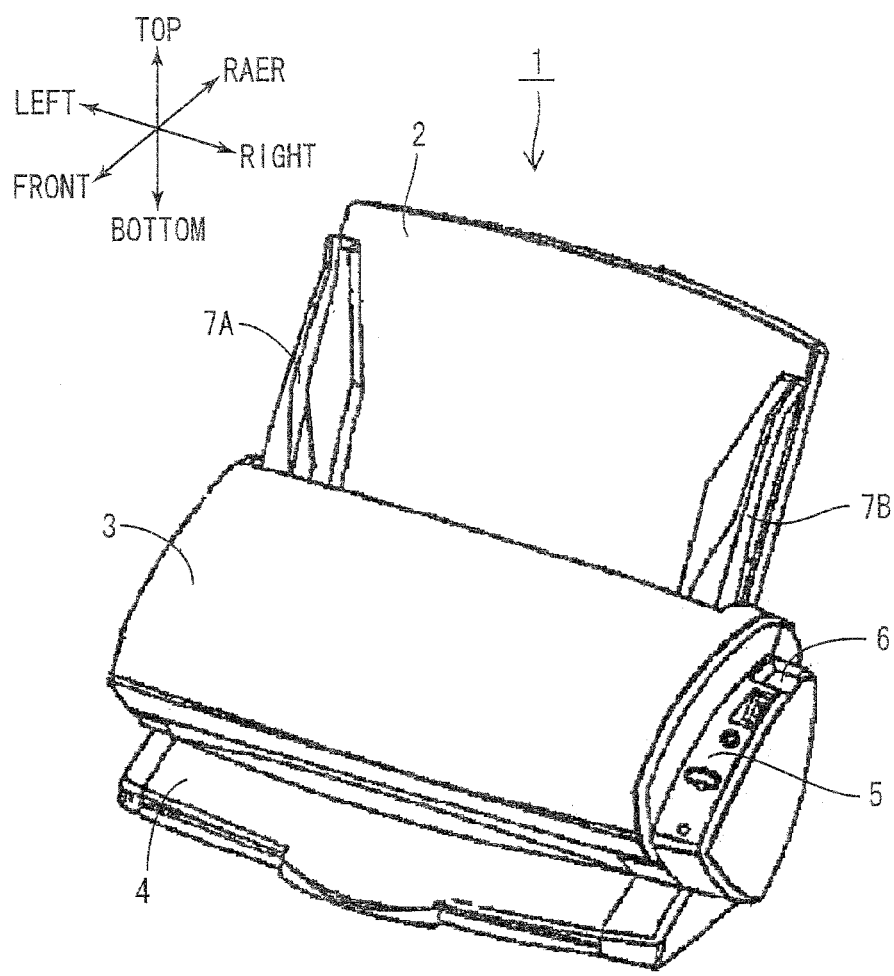
FIG. 1 is a perspective view showing an external appearance of the image-reading device according to a first embodiment of the present invention.

An image-reading device 1 as an image-processing device according to an embodiment of the present invention will be described with reference to FIGS. 1 through 9. The terms "upward", "downward", "upper", "lower", "above", "below", "beneath" and the like will be used throughout the description assuming that the image-reading device 1 is disposed in an orientation in which it is intended to be used. More specifically, in FIGS. 1, 2 and FIGS. 5 through 7, a side of a discharge tray 4 will be referred to as "front side", and a side opposite to the discharge tray 4 will be referred to as "rear side". Further, the terms "right side" and "left side" will be used when viewed from the printer 1 from the front side.

1. Mechanical Structure of the Image-Reading Device

The image-reading device 1 includes a tray 2, a main body 3, the discharge tray 4, and guides 7A and 7B. The tray 2 supports a sheet of original M (see FIG. 2). As the original M is conveyed into the main body 3, an image-reading unit 24 described later (see FIG. 2) inside the main body 3 reads an image from the original M being conveyed into the main body 3. After the image has been read, the original M is discharged onto the discharge tray 4. The image-reading device 1 with this configuration is called a "sheet feed scanner." The front end position of the tray 2 is an example of a set position and the rear end position of the discharge tray 4 is an example of a discharge position. The original M may include sheets of paper, plastic, or the like.

The tray 2 is disposed on the rear side of the main body 3 and slopes down toward the front. The guides 7A and 7B are provided on left and right sides of the tray 2 and are capable of sliding in the left and right directions. By pushing the guides 7A and 7B farther apart or closer together, the user can adjust the gap between the guides 7A and 7B to be equivalent to the left-to-right width of the original. One or a plurality of sheets of the original M may be set between the guides 7A and 7B.

Figure 2:
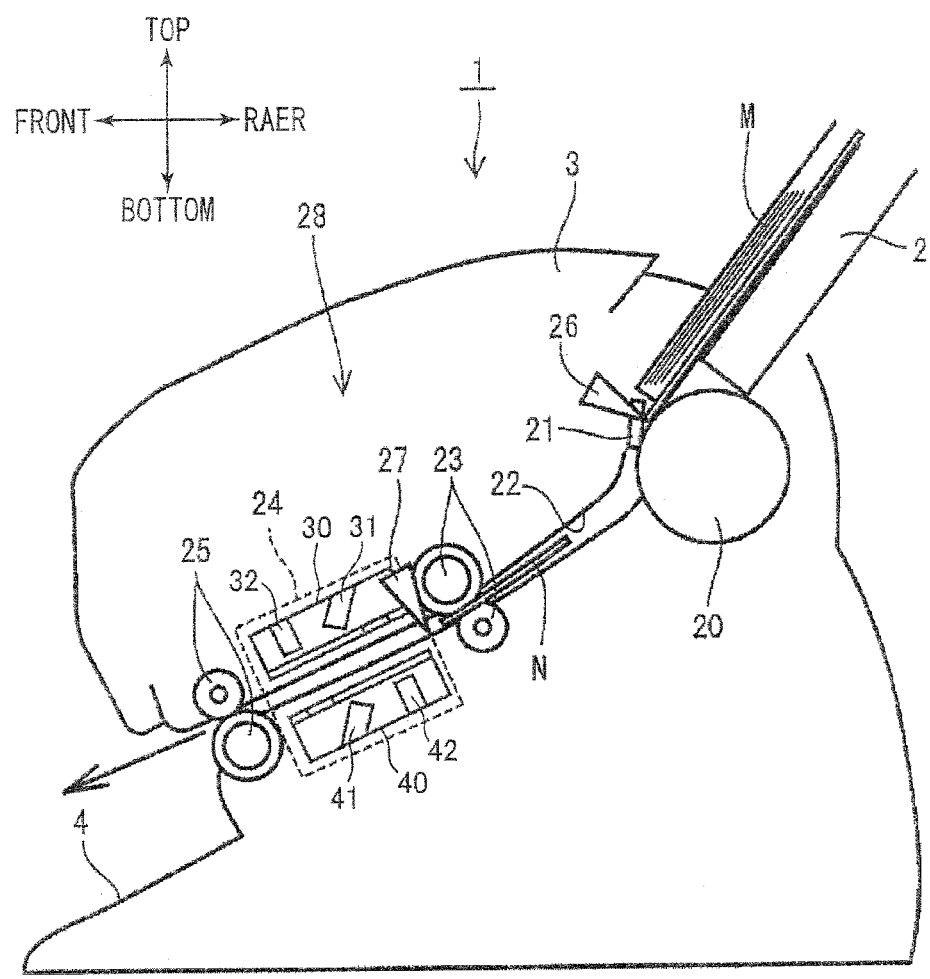
FIG. 2 shows a general internal structure of the image-reading device (conveyance state A)

As shown in FIG. 2, a paper-conveying path 22 as a conveying path is formed inside the main body 3, extending from the front end of the tray 2 to the rear end of the discharge tray 4. Along this paper-conveying path 22 are provided a pickup roller 20, a separating pad 21, conveying rollers 23, an image-reading unit 24 as an image-processing unit, discharge rollers 25, a front sensor 26, and a rear sensor 27.

The pickup roller 20 is disposed on the front side of the tray 2. Through frictional force, the rotating tray 2 pulls one or a plurality of sheets of the original M from the tray 2 into the main body 3. The separating pad 21 is disposed so as to confront the pickup roller 20 and, through frictional force, to separate the plurality of sheets of the original M so that only one sheet is fed into the main body 3 at a time.

The conveying rollers 23 are disposed farther downstream in the paper-conveying path 22 than the pickup roller 20 and separating pad 21. The conveying rollers 23 are driven by a motor (not shown) to convey a sheet of the original M on the paper-conveying path 22 forward. The image-reading unit 24 is disposed downstream in the paper-conveying path 22 from the conveying rollers 23. The image-reading unit 24 reads an image of the original M conveyed by the conveying rollers 23.

The image-reading unit 24 includes a pair of reading devices 30 and 40 confronting each other across the paper-conveying path 22. The reading device 30 is disposed above the paper-conveying path 22. The reading device 30 includes a light source 31 and a light-receiving unit 32. The light source 31 emits a light so as to strike a sheet of the original M being conveyed through the paper-conveying path 22. The light-receiving unit 32 receives a reflected light reflected off the original M. In this way, the reading device 30 reads an image from one surface (i.e., the top surface) of the original M as the original M is conveyed through the image-reading unit 24.

The reading device 40 is disposed below the paper-conveying path 22. The reading device 40 includes a light source 41 and a light-receiving unit 42. The light source 41 emits a light so as to strike a sheet of the original M being conveyed along the paper-conveying path 22. The light-receiving unit 42 receives a reflected light reflected off the original M. In this way, the reading device 40 reads an image from the other surface (i.e., the bottom surface) of the original M being conveyed through the image-reading unit 24. The reading devices 30 and 40 are preferably compact image sensors (CIS) or charge-coupled drive image sensors (CCD). The image-reading unit 24 is an example of an image processing unit.

The discharge rollers 25 are disposed on the downstream of the image-reading unit 24 in the paper-conveying path 22. The discharge rollers 25 convey sheets of the original M out of the main body 3 after images on the sheets have been read in the image-reading unit 24. The discharge tray 4 is disposed on the front side of the main body 3. Sheets of the original M conveyed out of the main body 3 are stacked on the discharge tray 4. Together, the paper-conveying path 22, pickup roller 20, conveying rollers 23, and discharge rollers 25 constitute a conveying mechanism 28. The pickup roller 20, conveying rollers 23, and discharge rollers 25 of the conveying mechanism 28 are preferably rotated in association by a common motor, for example. In this way, a plurality of sheets of the original M present in the paper-conveying path 22 will be conveyed simultaneously (together).

The front sensor 26 is disposed near the front end of the tray 2. The front sensor 26 detects the presence of the original M on the tray 2 and outputs a detection signal SG1 based on the detection results. The rear sensor 27 is disposed on the downstream of the front sensor 26. The rear sensor 27 detects the presence of a sheet of the original M at a position where the rear sensor 27 is provided and outputs a detection signal SG2 based on the detection results.

As shown in FIG. 1, a control unit 5 and a display unit 6 are also provided on the main body 3. The control unit 5 includes a power switch and various buttons for receiving commands and the like from the user. The display unit 6 displays the status of the image-reading device 1 and images that the image-reading unit 24 has read from an original.

2. Electrical Structure of the Image-Reading Device

Figure 3:
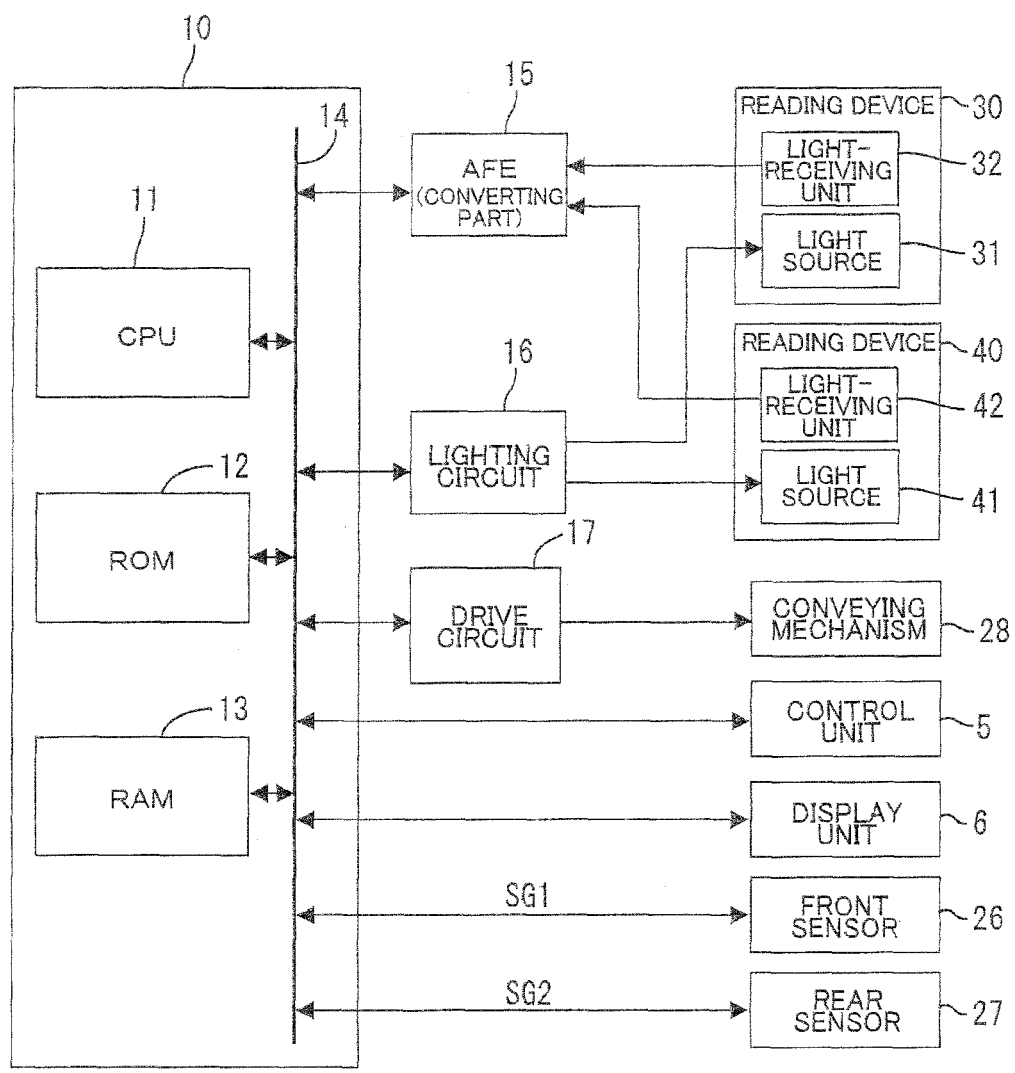
FIG. 3 is a block diagram showing a general electrical structure of the image-reading device.

The image-reading device 1 includes a control circuit 10 for controlling all components in the image-reading device 1. As shown in FIG. 3, the control circuit 10 has a central processing unit (CPU) 11, a ROM 12, and a RAM 13. A bus 14 provided in the control circuit 10 connects the CPU 11, ROM 12, and RAM 13 to the control unit 5, the display unit 6, an analog front end (AFE) 15, a lighting circuit 16, a drive circuit 17 for driving the rollers of the conveying mechanism 28, the reading devices 30 and 40, the front sensor 26, the rear sensor 27, and the like.

The ROM 12 stores various programs including a control program for controlling operations of the image-reading device 1. The CPU 11 controls the components of the image-reading device 1 based on the control programs read from the ROM 12.

The lighting circuit 16 is connected to each of the reading devices 30 and 40. The lighting circuit 16 transmits a signal to the reading devices 30 and 40 for lighting the light sources 31 and 41, respectively, and controlling their lighting times in response to commands from the CPU 11. When a signal is received from the lighting circuit 16, the reading devices 30 and 40 light the respective light sources 31 and 41 so that light is emitted from the light sources 31 and 41 over the indicated lighting time. While the light sources 31 and 41 emit light, the light-receiving units 32 and 42 receive light reflected off a sheet of the original M, and output read voltages corresponding to the intensities of the received light to the AFE 15.

The AFE 15 is connected to each of the reading devices 30 and 40. The AFE 15 has an A/D converter circuit for converting the read voltages outputted from the reading devices 30 and 40 into digital signals serving as read data. The AFE 15 converts the analog read voltage outputted from the reading device 30 or 40 to 8-bit (0-255) read data. The AFE 15 stores this read data in the RAM 13 via the bus 14.

3. Image Reading Process

Figure 4:
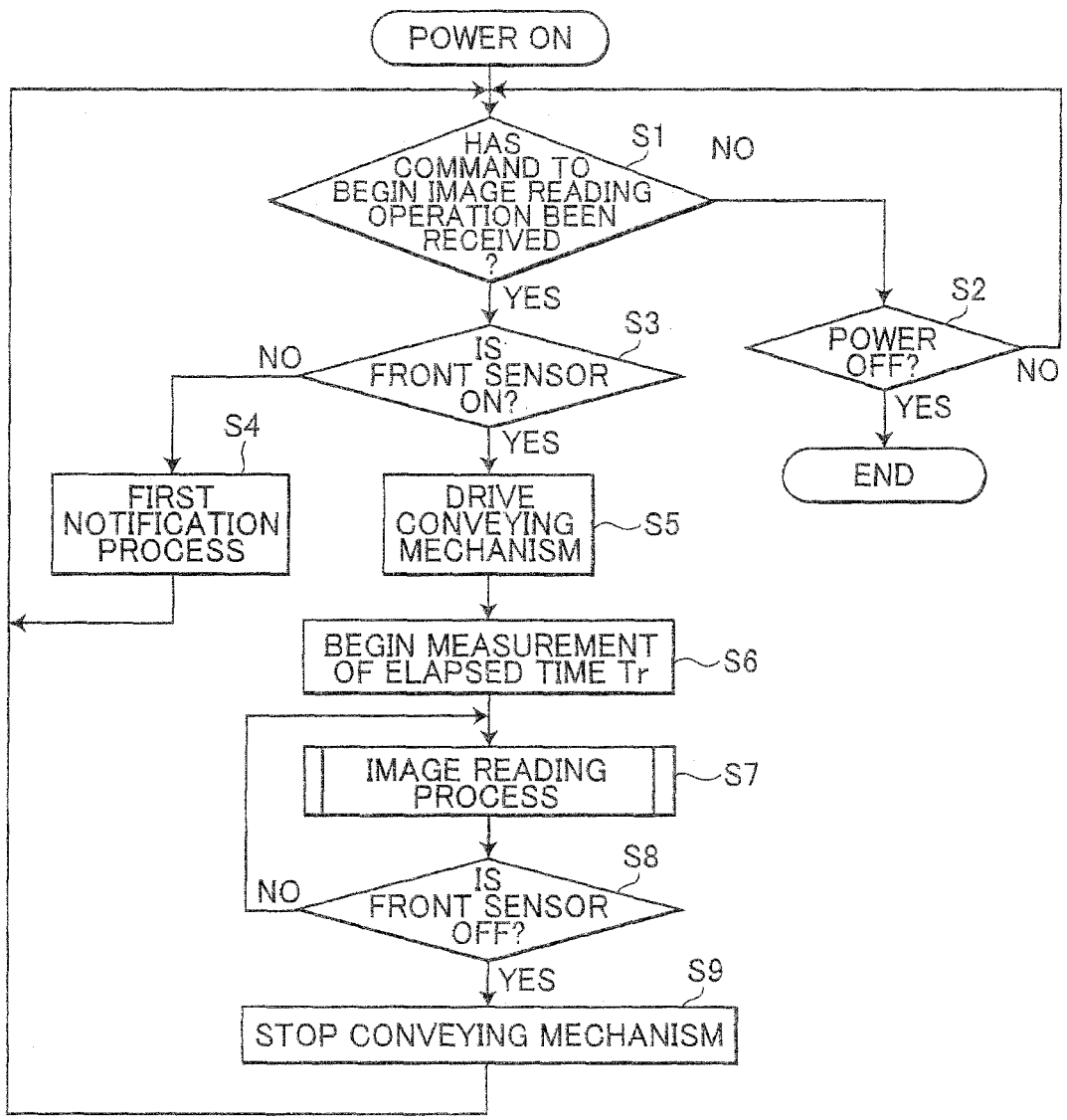
FIG. 4 is a flowchart illustrating steps in a main process executed by a CPU of a control circuit of the image-reading device.
Figure 5:
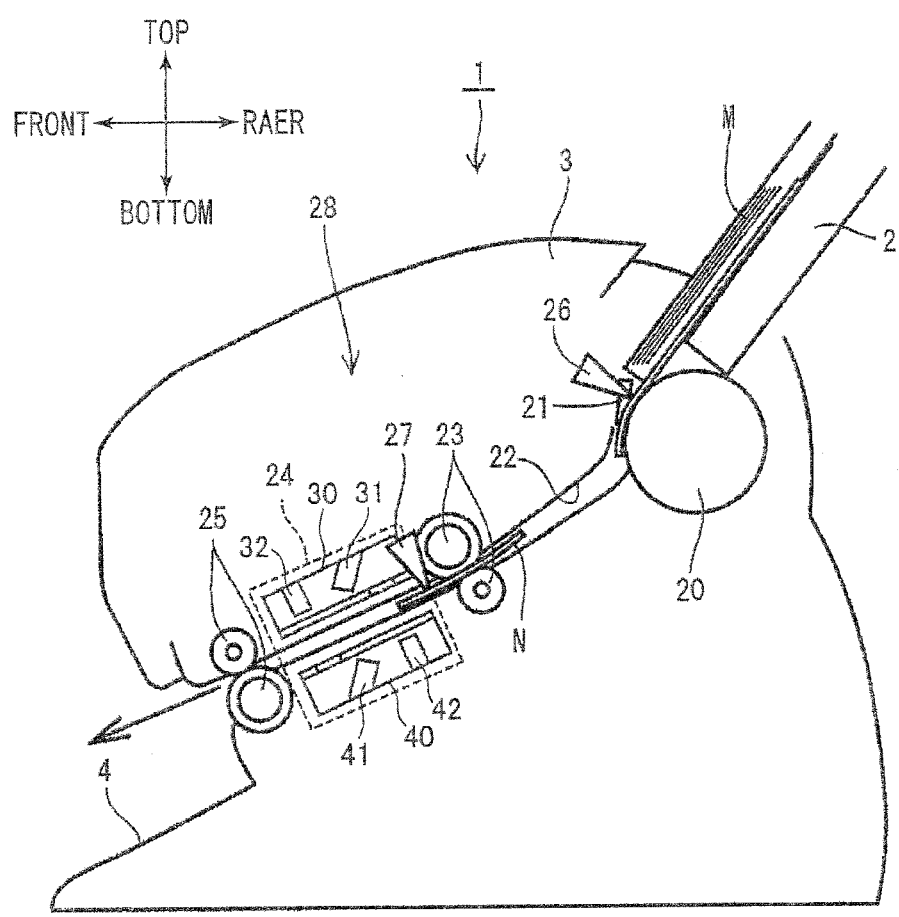
FIG. 5 shows a general internal structure of the image-reading device (conveyance state B)

FIG. 4 shows a flowchart illustrating steps in a main process executed by a CPU of a control circuit of the image-reading device. Like FIG. 2, FIGS. 5 through 7 show the general internal structure of the image-reading device 1. FIG. 2, FIG. 5, FIG. 6 and FIG. 7 show various conveyance states A through D of an original M and a residual sheet N after the CPU 11 of the control circuit 10 receives a command to begin an image reading operation. In the following description, the original M refers to sheets present in the tray 2, and the residual sheet N refers to a sheet present in the paper-conveying path 22 prior to the CPU 11 receiving a start command to begin an image reading operation.

When the user turns the power to the image-reading device 1 on by performing an operation on the control unit 5, the main process (control program) of the image-reading device 1 is executed. Firstly, in S1 the CPU 11 determines whether or not a command to begin an image reading operation has been received as a result of an operation on the control unit 5 performed by the user. When the CPU 11 determines that the command to begin an image reading operation has not been received (S1: NO), the CPU 11 advances to S2. In S2, the CPU 11 determines whether or not the power of the image-reading device 1 has been turned off by an operation on the control unit 5 performed by the user. The CPU 11 determines that the power of the image-reading device 1 has turned off (S2: YES), the CPU 11 ends this main process. When the power of the image-reading device 1 has not been turned off (S2: NO) and the command to begin an image reading operation has not been received (S1: NO), the CPU 11 continues to wait until the user performs an operation on the control unit 5 to begin an image reading operation.

The CPU 11 advances to S3 when a command to begin an image reading operation has been received as a result of an operation on the control unit 5 performed by the user (S1: YES).

In S3, the CPU 11 determines whether an original M is present in the tray 2 based on the detection signal SG1 received from the front sensor 26. That is, the CPU 11 determines whether or not the front sensor 26 is on. If an original M is not present in the tray 2 (S3: NO), in S4 the CPU 11 executes a first notification process for displaying a message on the display unit 6, for example, such as a message prompting the user to set the original M in the tray 2 or an error message indicating that an original M has not been set in the tray 2. The method of notification in S4 may additionally or alternatively involve the playing of a sound or the issuing of a notification to an external device through data communications. Subsequently, the CPU 11 returns to the process of S1.

If the CPU 11 determines that an original M is present in the original tray 2 (S3: YES), in S5 the CPU 11 controls the drive circuit 17 to begin driving the conveying mechanism 28. As a result, one sheet of the original M provided in the original tray 2 is conveyed along the paper-conveying path 22. If a residual sheet N is present in the paper-conveying path 22 at this time, the residual sheet N is conveyed simultaneously.

In conveyance state A shown in FIG. 2, a residual sheet N such as a business card is present in the paper-conveying path 22 on the upstream of the detection position of the rear sensor 27 relative to the paper-conveying direction, and one sheet of the original M from the tray 2 has advanced to the detection position of the front sensor 26.

In conveyance state A shown in FIG. 2, when the power of the image-reading device 1 is turned on, the CPU 11 does not control the drive circuit 17 to begin driving the conveying mechanism 28 regardless of whether or not the residual sheet N is present in the paper-conveying path 22 if the CPU 11 has not received the command to begin an image reading operation (S1: NO). That is, when the power of the image-reading device 1 is turned on, the CPU 11 does not control the drive circuit 17 to begin driving the conveying mechanism 28 in the absence of receiving the command to begin an image reading operation even if the residual sheet N is present in the paper-conveying path 22. When the CPU 11 has received the command to begin an image reading operation (S1: YES) and an original M is present in the tray 2 (S3: YES), the CPU 11 controls the drive circuit 17 to begin driving the conveying mechanism 28.

In other words, the CPU 11 controls the drive circuit 17 to begin driving the conveying mechanism 28 regardless of whether or not the residual sheet N is present in the paper-conveying path 22, when the CPU 11 has received the command to begin an image reading operation. Hence, the image-reading device 1 can reduce the number of cases in which the conveying mechanism 28 is driven simply to discharge a residual sheet N in the conventional image-reading device and image-forming device.

The CPU 11 controls the drive circuit 17 to begin driving the conveying mechanism 28 (S5), at the same time the CPU 11 begins measurement of an elapsed time Tr (S6). Then, the CPU 11 advances to an image-reading process of S7.

Figure 8:
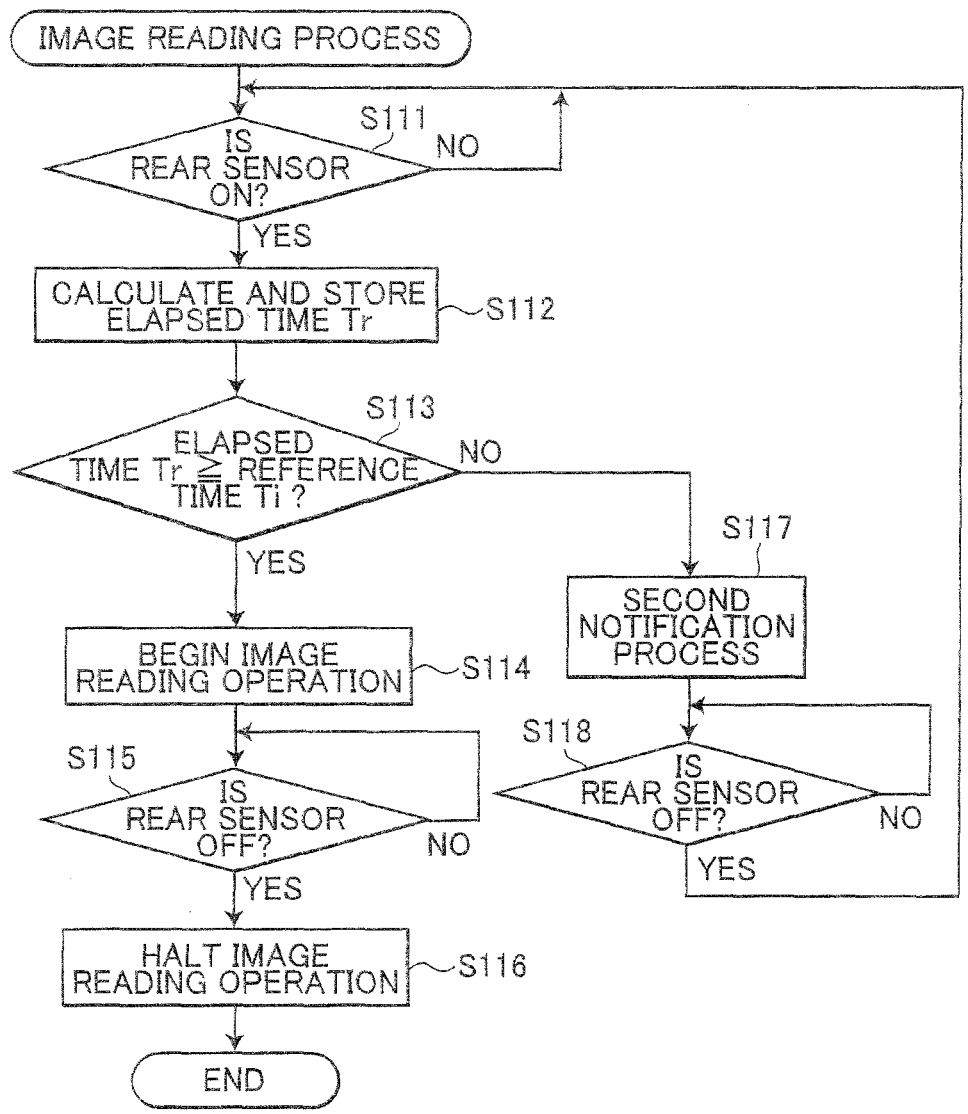
FIG. 8 is a flowchart illustrating steps in an image reading process by a CPU of a control circuit of the image-reading device.

FIG. 8 is a flowchart illustrating the image-reading process of S7 in FIG. 4. Firstly, the CPU 11 determines in S111 whether the rear sensor 27 has detected a sheet at a position where the rear sensor 27 is provided in the paper-conveying path 22, based on the detection signal SG2 received from the rear sensor 27. That is, the CPU 11 determines whether or not the rear sensor 27 is on. If an original M is not present at the position where the rear sensor 27 is provided in the paper-conveying path 22 (S111: NO), the CPU 11 continues to wait while a sheet has been detected (S111: YES).

When it is determined that the rear sensor 27 has detected a sheet (S111: YES), in S112 the CPU 11 calculates an elapsed time Tr beginning from the point that the measurement of the elapsed time Tr was begun in S6 of FIG. 4 until the rear sensor 27 detected the sheet and stores this elapsed time Tr in the RAM 13. Here, the point in time that the CPU 11 received a command to begin image reading, the point in time that the front sensor 26 detected the sheet of the original M, or the point in time that the conveying mechanism 28 was initially driven may be treated as the beginning time for measuring the elapsed time Tr.

In S112 the CPU 11 reads a reference time Ti from the RAM 13 and determines whether the elapsed time Tr calculated in S112 is greater than or equal to the reference time Ti. The reference time Ti is preferably set to the amount of time that would elapse after the CPU 11 begins driving the conveying mechanism 28 until the rear sensor 27 would detect a sheet when a residual sheet N is not present in the paper-conveying path 22, for example. In other words, the reference time Ti is preferably the elapsed time after the conveying mechanism 28 begins conveying a sheet of the original M from the original tray 2 until the rear sensor 27 detects this sheet. Note that the reference time Ti can change over time as the conveying mechanism 28 ages. Therefore, the image-reading device 1 is preferably provided with a mode for calculating the elapsed time Tr by driving the conveying mechanism 28 when a residual sheet N is not present in the paper-conveying path 22 and updating the reference time Ti to this calculated value. Further, while the RAM 13 is one example of memory that may be used for storing the reference time Ti, a hard disk drive, flash memory, CD-ROM, or other storage medium may be used in place of the RAM 13.

Next, the CPU 11 performs a control process for controlling the image-reading unit 24 to execute the image reading on sheets whose elapsed time Tr is greater than or equal to the reference time Ti and not to execute the image reading on sheets whose elapsed time Tr is less than the reference time Ti. This control process is described below in greater detail.

3-1. Process Performed when a Residual Sheet is not Present

Since the elapsed time Tr for the sheet of the original M after the CPU 11 starts driving the conveying mechanism 28 in S5 of FIG. 4 is greater than or equal to the reference time Ti when a residual sheet N is not present in the paper-conveying path 22, i.e., when the residual sheet N is eliminated from conveyance state A shown in FIG. 2 (S113: YES), in S114 the CPU 11 controls the image-reading unit 24 to perform an image reading operation on the original M using the time at which the rear sensor 27 detects the original M as a trigger.

If the user has performed an operation on the control unit 5 to set the image-reading device 1 to a single-sided reading mode, the CPU 11 controls one of the reading devices 30 and 40 to execute a reading operation. However, if the image-reading device 1 is set to a double-sided reading mode, the CPU 11 controls both the reading devices 30 and 40 to execute reading operations. In S115 the CPU 11 determines whether or not the rear sensor 27 is off, based on detection results from the rear sensor 27. If the rear sensor 27 is on, indicating that a sheet is present at the detection position of the rear sensor 27 (S115: NO), the CPU 11 continues the reading operations while repeatedly performing the determination in S115. When the detection results of the rear sensor 27 indicate that a sheet is no longer present (S115: YES), in S116 the CPU 11 determines that the image for one sheet of the original M has been read and controls the image-reading unit 24 to halt the image reading operation and ends the current image-reading process of S7 in FIG. 4.

3-2. Process Performed when a Residual Sheet is Present

Figure 9:
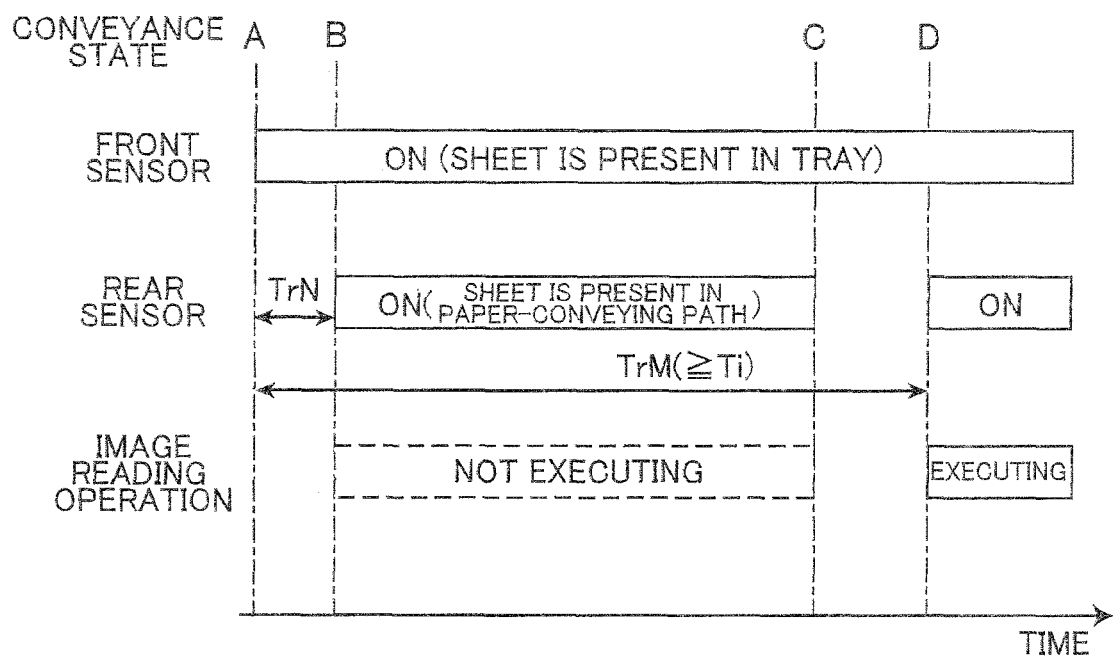
FIG. 9 is a time chart showing detection results of a front sensor in conveyance states A through D.

FIG. 9 is a time chart showing detection results of the front sensor 26 and rear sensor 27 in conveyance states A through D. In conveyance state A shown in FIG. 2, a residual sheet N such as a business card is present in the paper-conveying path 22 on the upstream of the detection position of the rear sensor 27 relative to the paper-conveying direction, and one sheet of the original M from the original tray 2 has advanced to the detection position of the front sensor 26. In conveyance state A, the residual sheet N has not yet been detected by the rear sensor 27 when the CPU 11 begins driving the conveying mechanism 28 in S5. In conveyance state B shown in FIG. 5, the leading edge of the original M has advanced to a position downstream of the detection position of the front sensor 26, and the rear sensor 27 is detecting the residual sheet N. In this case, an elapsed time TrN from when the CPU 11 began driving the conveying mechanism 28 (i.e. the CPU 11 began measurement of an elapsed time Tr in S6) and until the rear sensor 27 detected the residual sheet N is shorter than the reference time Ti described above (see FIG. 9).

Therefore, in S113 the CPU 11 determines that the elapsed time TrN for the residual sheet N is shorter than the reference time Ti (S113: NO) and in S117 executes a second notification process to display a message on the display unit 6 notifying the user that a residual sheet N is present in the paper-conveying path 22, for example. Alternative methods of notification may involve playing a sound or issuing a notification to an external device through data communications. The CPU 11 may even continue outputting the same notification while the sheet of the original M succeeding the residual sheet N is discharged into the discharge tray 4, thereby notifying the user that the residual sheet N is mixed in with the discharged sheets of the original M.

After executing the second notification process, in S118 the CPU 11 determines whether a sheet is still present at the detection position of the rear sensor 27 based on the detection results received therefrom. While a sheet is still present at the detection position of the rear sensor 27 (S118: NO), the CPU 11 does not control the image-reading unit 24 to execute an image reading operation on the residual sheet N. When the rear sensor 27 has turned off, indicating that the sheet is no longer present (S118: YES), the CPU 11 returns to S111 and repeats the process described above. Hence, when the residual sheet N is in conveyance state C shown in FIG. 6, the CPU 11 discharges the residual sheet N onto the discharge tray 4 without executing an image reading operation (see FIG. 8).

Figure 6:
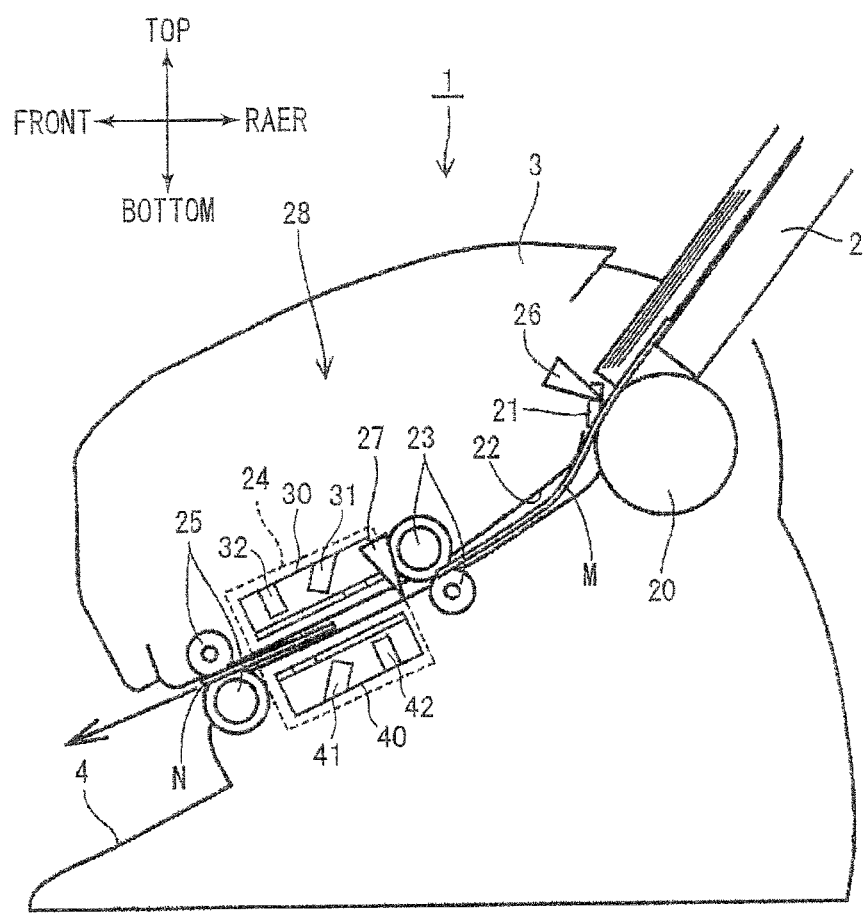
FIG. 6 shows a general internal structure of the image-reading device (conveyance state C)
Figure 7:
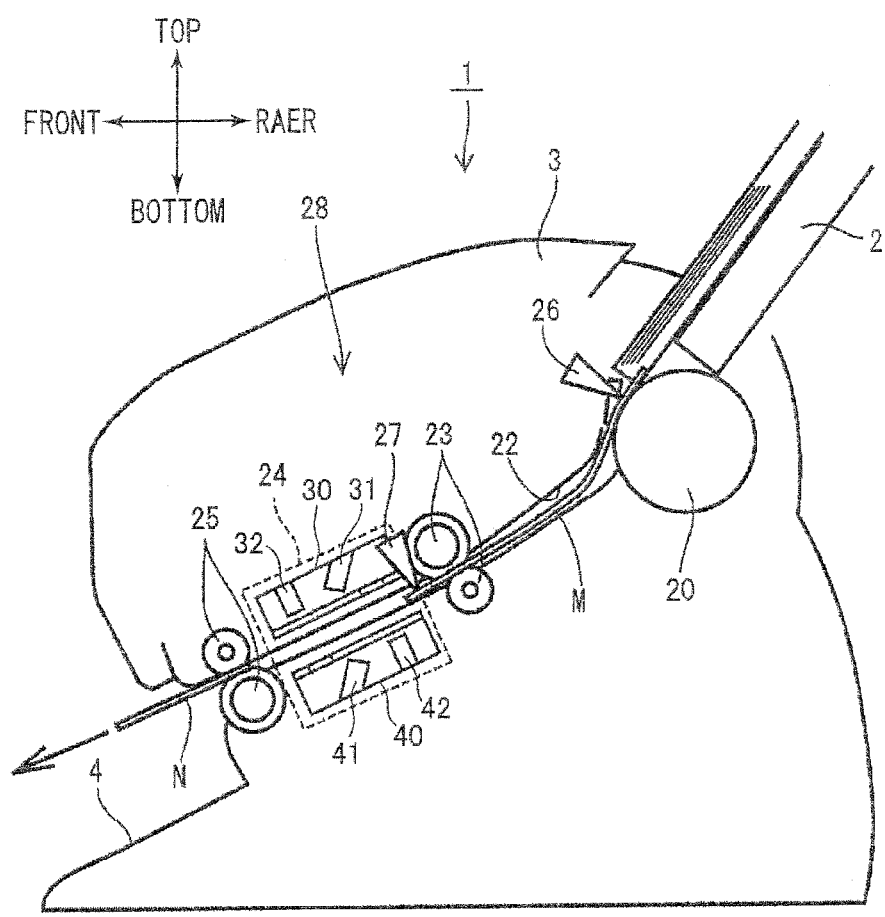
FIG. 7 shows a general internal structure of the image-reading device (conveyance state D)

After the residual sheet N has changed from conveyance state C shown in FIG. 6 to conveyance state D shown in FIG. 7, the rear sensor 27 detects the original M (S111: YES). In S112 the CPU 11 calculates an elapsed time TrM from the time that the CPU 11 began driving the conveying mechanism 28 in S5 (i.e. the CPU 11 began measurement of an elapsed time Tr in S6) until the time that the rear sensor 27 detected the original M. Here, the CPU 11 determines in S113 that the elapsed time TrM is greater than or equal to the reference time Ti (S113: YES; see FIG. 8). Accordingly, in S114 the CPU 11 begins controlling the image-reading unit 24 to execute an image reading operation on the original M.

After completing the reading operation, in S8 the CPU 11 determines whether or not there remain any sheets of original M in the tray 2 based on the detection signal SG1 received from the front sensor 26. That is, the CPU 11 determines whether or not the front sensor 26 is off. If the front sensor 26 is on, indicating that sheets of the original M remain in the tray 2 (S8: NO), the CPU 11 returns to S7 and repeats the image-reading process. However, if there are no more sheets of the original M in the tray 2 (S8: YES), the CPU 11 controls the drive circuit 17 to stop driving the conveying mechanism 28, returns to S1 and continues to wait until the user performs an operation on the control unit 5 to begin an image reading operation.

4. Effects of the Embodiment

As described above, if a residual sheet N is not present in the paper-conveying path 22 when the CPU 11 begins driving the conveying mechanism 28 in response to a command from the user to initiate an image reading operation, the elapsed time TrM after the CPU 11 began driving the conveying mechanism 28 (i.e. the CPU 11 began measurement of the elapsed time Tr) and until the rear sensor 27 detected a sheet of the original M in the original tray 2 is greater than or equal to the reference time Ti. However, if a residual sheet N is present in the paper-conveying path 22 at this time, the elapsed time TrN indicating the time elapsed after the CPU 11 began driving the conveying mechanism 28 (i.e. the CPU 11 began measurement of an elapsed time Tr) until the rear sensor 27 detected the residual sheet N is less than the reference time Ti.

Therefore, the control circuit 10 according to this embodiment can begin driving the conveying mechanism 28 based on a reception of a command to begin an image reading operation (S5) and can treat a sheet detected by the rear sensor 27 as a residual sheet N when the elapsed time Tr from the time that the CPU 11 began driving the conveying mechanism 28 until the time that the rear sensor 27 detected the sheet conveyed by the conveying mechanism 28 is less than the reference time Ti (S113: NO). In this case, the CPU 11 discharges the residual sheet N without executing an image reading operation. However, when the elapsed time Tr is greater than or equal to the reference time Ti (S113: YES), the control circuit 10 can treat this sheet as an original M conveyed from the tray 2, rather than a residual sheet N. Consequently, the CPU 11 discharges the sheet of the original M after executing an image reading operation (S114 and S116).

Through this process, the control circuit 10 can discharge the residual sheet N while driving the conveying mechanism 28 to convey a sheet of the original M. Hence, by driving the conveying mechanism 28 in response to a reception of a command to begin an image reading operation after the power of the image-reading device 1 has turned on, the number of cases in which the conveying mechanism 28 is driven simply to discharge a residual sheet N can be reduced. Further, unnecessary image reading operations on such residual sheets N can be reduced.

Further, if the elapsed time Tr is smaller than the reference time Ti (S113: NO), in S117 the control circuit 10 can notify the user that a residual sheet N is present in the paper-conveying path 22.

Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

(1) In the embodiment described above, the image-reading device 1 serves as an example of the image processor. However, the image processor of the present invention may be applied to a printing device or a facsimile machine having a paper-conveying path and functioning to form images on sheets conveyed along this paper-conveying path, the paper-conveying path extending from a feed tray for feeding sheets into the device to a discharge tray for receiving sheets discharged from the device. In the case of the printing device, the image reading process of the present invention (see FIG. 4, where the process in S7 is replaced with a printing process) can be executed to minimize the number of times that the conveying mechanism of the printing device is driven simply to discharge a residual sheet from the device. In other words, the present invention may be applied to any image processor having a conveying mechanism with a conveying path extending from a sheet feeding position to a sheet discharging position that executes an image process on sheets conveyed along this conveying path.

(2) The conveying mechanism 28 described in the embodiment described above is configured of a plurality of rollers, but the image-reading device 1 may utilize a conveying mechanism configured of a belt that is driven to circulate.

(3) In the embodiment described above, the reading devices 30 and 40 are arranged to confront each other across the paper-conveying path 22. However, the reading devices 30 and 40 may be disposed at positions along the paper-conveying path 22 that are offset in the conveying direction. Alternatively, the image-reading device may be provided with only one reading device. However, the effects described in the embodiment are obtained with an image-reading device 1 provided with the two reading devices 30 and 40 to be able to read images from both surfaces of a sheet.

(4) In the embodiment described above, the control circuit 10 is provided with a single CPU 11 for executing the image reading process. However, the control circuit 10 may be provided with a plurality of CPUs 11 for executing the above control process. The CPUs may be configured to individually execute all or some of the processes for command reception, user notification, and control. Further, the CPU of the control circuit 10 is not limited to a general purpose CPU, but may be configured of a special circuit, such as an application-specific integrated circuit or a field-programmable gate array.

What is claimed is:

1. An image-processing device comprising:
    a conveying path extending from a set position in which an original sheet is set to a discharge position in which the original sheet is discharged from the image-processing device;
    a conveying mechanism configured to convey a plurality of original sheets in the conveying path simultaneously;
    a sensor configured to output a detection signal if an original sheet is present at a detection position in the conveying path;
    an image processing unit disposed downstream of the sensor in the conveying path and configured to execute an image processing;
    a command reception unit configured to receive a command to begin the image processing;
    a control unit configured to control the conveying mechanism and the image processing unit; and
    a memory storing a reference time, the reference time being a predetermined time that should elapse from a point of time that the control unit begins to drive the conveying mechanism to convey an original sheet set in the set position until a point in time that the conveying mechanism conveys the original sheet from the set position to the detection position,
    wherein the control unit is further configured to determine whether or not an elapsed time is greater than or equal to the reference time, the elapsed time being time from a point in time that the control unit begins to drive the conveying mechanism in response to a reception of the command by the command reception unit until a point in time that the sensor outputs the detection signal;
    wherein the control unit controls the image processing unit such that the image processing unit does not execute the image processing when it is determined that the elapsed time is less than the reference time, and such that the image processing unit executes the image processing relevant to an original sheet that is present at the detection position when it is determined that the elapsed time is greater than or equal to the reference time.

2. The image-processing device according to claim 1, further comprising a notification unit configured to notify that a residual sheet is present in the conveying path when the control unit determines that the elapsed time is less than the reference time, the residual sheet corresponding to the original sheet that is present in the conveying path when a power of the image-processing device is turned on.

3. The image-processing device according to claim 1, wherein the image processing unit is an image reading unit to execute an image reading,
wherein the control unit controls the image reading unit such that the image reading unit does not execute an image reading when it is determined that the elapsed time is less than the reference time, and such that the image reading unit executes the image reading relevant to an original sheet that is present at the detection position when it is determined that the elapsed time is greater than or equal to the reference time.

4. The image-processing device according to claim 3, wherein the control unit begins to drive the conveying mechanism when the command is received by the command reception unit after a power of the image-processing device is turned on.

5. The image-processing device according to claim 3, wherein the control unit controls the image reading unit and the conveying mechanism such that the conveying mechanism continues to convey an original sheet from the detection position to the discharge position when it is determined that the elapsed time is less than the reference time
wherein the control unit is further configured to determine whether or not another elapsed time is greater than or equal to the reference time, the another elapsed time being time from a point in time that the control unit beins to drive the conveying mechanism in response to the reception of the command by the command reception unit until a point in time that the sensor outputs again the detection signal after the sensor has output the detection signal;
wherein the control unit controls the image reading unit and the conveying mechanism such that the image reading unit does not execute the image reading relevant to another original sheet that is present at the detection position when it is determined that the another elapsed time is less than the reference time, and such that the image reading unit executes the image reading relevant to the another original sheet that is present at the detection position when it is determined that the another elapsed time is greater than or equal to the reference time.

6. A non-transitory computer readable storage medium storing a set of program instructions executed by an image-processing device comprising: a conveying path extending from a set position in which an original sheet is set to a discharge position in which the original sheet is discharged from the image-processing device; a conveying mechanism configured to convey a plurality of original sheets in the conveying path simultaneously; a sensor configured to output a detection signal if an original sheet is present at a detection position in the conveying path; an image processing unit disposed downstream of the sheet sensor in the conveying path and configured to execute an image processing; and a memory storing a reference time, the reference time being a predetermined time that should elapse from a point of time that the control unit begins to drive the conveying mechanism to convey an original sheet set in the set position until a point in time that the conveying mechanism conveys the original sheet from the set position to the detection position,
the set of program instructions comprising:
receiving a command to begin the image processing;
controlling the image processing unit to determine whether or not an elapsed time is greater than or equal to the reference time, the elapsed time being time from a point in time that the control unit begins to drive the conveying mechanism in response to a reception of the command by the command reception unit until a point in time that the sensor outputs the detection signal; and
controlling the image processing unit such that the image processing unit does not execute the image processing when it is determined that the elapsed time is less than the reference time, and such that the image processing unit executes the image processing relevant to an original sheet that is present at the detection position when it is determined that the elapsed time is greater than or equal to the reference time.

7. The image-processing device according to claim 3, wherein the control unit is further configured to calculate the elapsed time each time the sensor outputs the detection signal;
wherein the control unit determines, each time the elapsed time is calculated, whether or not the calculated elapsed time is greater than or equal to the reference time;
wherein the control unit controls, each time the control unit make a determination, the image reading unit and the conveying mechanism in a manner that:
when it is determined that the calculated elapsed time is less than the reference time, the image reading unit does not execute the image reading relevant to an original sheet that is present at the detection position and the conveying mechanism continues to convey the original sheet from the detection position to the discharge position; and
when the calculated elapsed time is greater than or equal to the reference time, the image reading unit executes the image reading relevant to an original sheet that is present at the detection position.

* * * * *